UNITED STATES PATENT OFFICE.

JASPER G. UPPER, OF ST. THOMAS, CANADA.

IMPROVEMENT IN LUBRICATING COMPOUNDS.

Specification forming part of Letters Patent No. 179,744, dated July 11, 1876; application filed March 13, 1876.

*To all whom it may concern:*

Be it known that I, JASPER G. UPPER, of St. Thomas, Province of Ontario, Canada, have invented a new and Improved Lubricator for Journals, of which the following is a specification:

The object of this invention is to furnish an improved lubricator for the journals of cars, steamboats, and machinery, to keep them from heating and cool them when hot.

The invention consists in the lubricator formed of tallow, rosin, salt, sulphur, and plumbago, in the proportions and manner hereinafter fully described.

In preparing my improved lubricator I take five pounds of tallow, one pound of rosin, and one-half pound of salt, six ounces of sulphur, and three ounces of plumbago. These ingredients are melted and thoroughly mixed together and put into cans and boxes for market and use.

Having thus described my invention, I claim as new and desire to secure by Letters Patent—

A lubricator formed of tallow, rosin, salt, sulphur, and plumbago, in substantially the proportions herein set forth.

JASPER G. UPPER.

Witnesses:
ROBERT BROWN,
GEO. AMOILER.